United States Patent

[11] 3,545,472

[72] Inventor Rudolph J. Franz
Arlington Heights, Illinois
[21] Appl. No. 640,935
[22] Filed May 24, 1967
[45] Patented Dec. 8, 1970
[73] Assignee Eaton Yale & Towne Inc.
a corporation of Ohio

[54] TRANSDUCER
10 Claims, 7 Drawing Figs.
[52] U.S. Cl. .................................................. 137/116.5,
236/92; 137/495, 137/627.5; 251/130
[51] Int. Cl. ...................................................... G05d 16/18
[50] Field of Search ........................................... 137/116.5,
495, 85, 118, 119, 627.5; 251/130, 11, 129;
236/75, 92, 45, 68

[56] References Cited
UNITED STATES PATENTS
| | | | |
|---|---|---|---|
| 2,631,598 | 3/1953 | Dillman | 236/68X |
| 2,691,413 | 10/1954 | Leslie | 236/92UX |
| 2,858,840 | 11/1958 | Wright | 137/596.2X |
| 2,966,891 | 1/1961 | Williams | 137/85X |
| 3,250,293 | 5/1966 | Adams | 251/129X |
| 3,294,320 | 12/1966 | Franz | 251/11X |
| 1,887,322 | 11/1932 | Nettleton | 137/82 |
| 2,844,157 | 7/1958 | Griffith | 137/82 |

Primary Examiner—William F. O'Dea
Assistant Examiner—William H. Wright
Attorney—Hill, Sherman, Meroni, Gross and Simpson ABSTRACT: An electromechanical transducer for regulating the level of vacuum from a vacuum sources to a point of use. Included is a housing having a vacuum port for connection to the source of vacuum, a control port for connection to the point of use and a vacuum chamber communicating the two ports. A valve mechanism extends into the vacuum chamber and is movable between two positions for varying the level of vacuum at the control port as a function of the position of the valve mechanism. A pressure differential diaphragm is mounted on the valve mechanism and is exposed on one side to the vacuum chamber and on the other side to atmosphere for biasing the valve mechanism as a function of the pressure differential thereacross. A spring biases the valve mechanism in one direction and an electric solenoid coil serves to urge the valve mechanism in an opposite direction with a force which varies as a function of the flow of current through the coil. A rheostat is connected in series with the coil for varying the current therethrough. The spring may comprise a bimetal element and an electric resistance heater may be mounted on the bimetal and a rheostat or a thermistor may be connected in series therewith for varying the force acting on the valve mechanism in said one direction. The level of vacuum in the vacuum chamber and thus at the control port will be maintained at a level whereby the forces acting on the valve mechanism by the diaphragm and the sole plate equal the force acting on the valve mechanism by the spring.

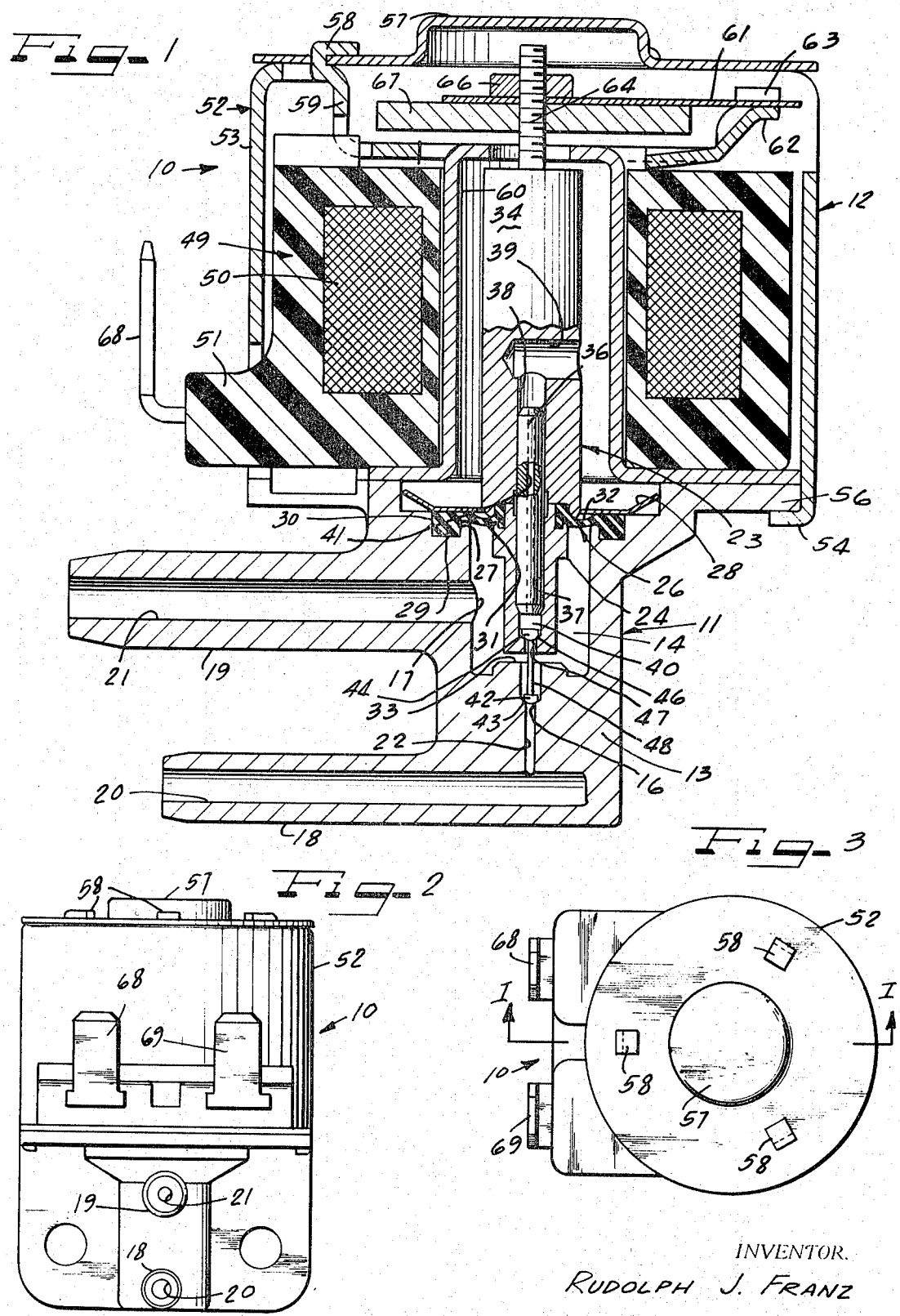

INVENTOR.
RUDOLPH J. FRANZ 3,545,472

TRANSDUCER

BACKGROUND OF THE INVENTION

The general field of art to which the present invention pertains is transducers and a more particular field is that of electromechanical transducers for regulating the lever of vacuum from a source to a point of use.

Vacuum modulators operative in response to ancillary power levels are known in the art. For example, in one arrangement the level of vacuum is regulated in response to variations in temperature ambient a bimetal element. While the useful applications of such transducers are varied there are certain applications for which known transducers are not especially suited.

In transducers wherein vacuum level is regulated by temperature ambient a bimetal, for example, while the effective temperature of the bimetal can be selectively varied by mounting a variable resistance heater on or in proximity to the bimetal such control may be inadequate for applications wherein the level of vacuum is to be responsive to more than one changing condition. Furthermore, in some applications a bimetal may be unable to provide a sufficient source of power unless increased in physical size to a prohibitive degree.

SUMMARY

An electromechanical transducer constructed in accordance with the principles of the present invention may be briefly summarized as comprising a vacuum modulator which is controlled as a function of the flow of current through a solenoid. The level of control power may thus be substantially increased over the power available from a bimetal element, although a bimetal may be included as an auxiliary source of control power to render the level of vacuum responsive to more than one condition.

More specifically, the transducer of the present invention comprises a housing having a vacuum port, a control port and a vacuum chamber communicating the two ports, a valve mechanism extending into the vacuum chamber and movable in opposite directions for regulating the level of vacuum between the ports, means biasing the valve mechanism in one of said opposite directions and electric solenoid means comprising a solenoid coil mounted on the housing and a sole plate mounted in spaced relation to the coil and operatively connected to the valve mechanism for urging the valve mechanism in the other of said opposite directions with a force which varies as a function of the current passing through the coil.

The coil may be connected into an electrical circuit which includes a rheostat for varying the current in the coil. The biasing means may comprise a resilient flexible member such as a spring or a bimetal element. An electric heater may be mounted on the bimetal and another rheostat may be wired in series with the heater whereby the level of vacuum at the control port may be modulated as a function of two variables, parameters, or sets of changing conditions.

It is, therefore, an object of the present invention to provide an improved, more powerful electromechanical transducer for modulating the level of vacuum between a vacuum source and a point of utilization.

Another object is to render a transducer of the type described responsive to more than one variable condition or parameter.

Another object is to utilize in such a transducer an electric solenoid as a source of control power.

Another object is to provide an electromechanical transducer for regulating a level of vacuum from a source to a point of use as a function of the current flow in two separate electrical control circuits.

Many other features, advantages and additional objects of the present invention will become manifest to those versed in the art upon making reference to the detailed description which follows and the accompanying sheets of drawings, in which preferred structural embodiments incorporating the principles of the present invention are shown by way of illustrative example only.

BRIEF DESCRIPTION OF THE DRAWINGS

FIG. 1 is an enlarged vertical sectional view of an electromechanical transducer constructed in accordance with the principles of the present invention taken substantially along lines I–I of FIG. 3.

FIGS. 2 and 3 are vertical elevational and plan views of the transducer shown in FIG. 1.

DESCRIPTION OF THE PREFERRED EMBODIMENTS

Figure 4:
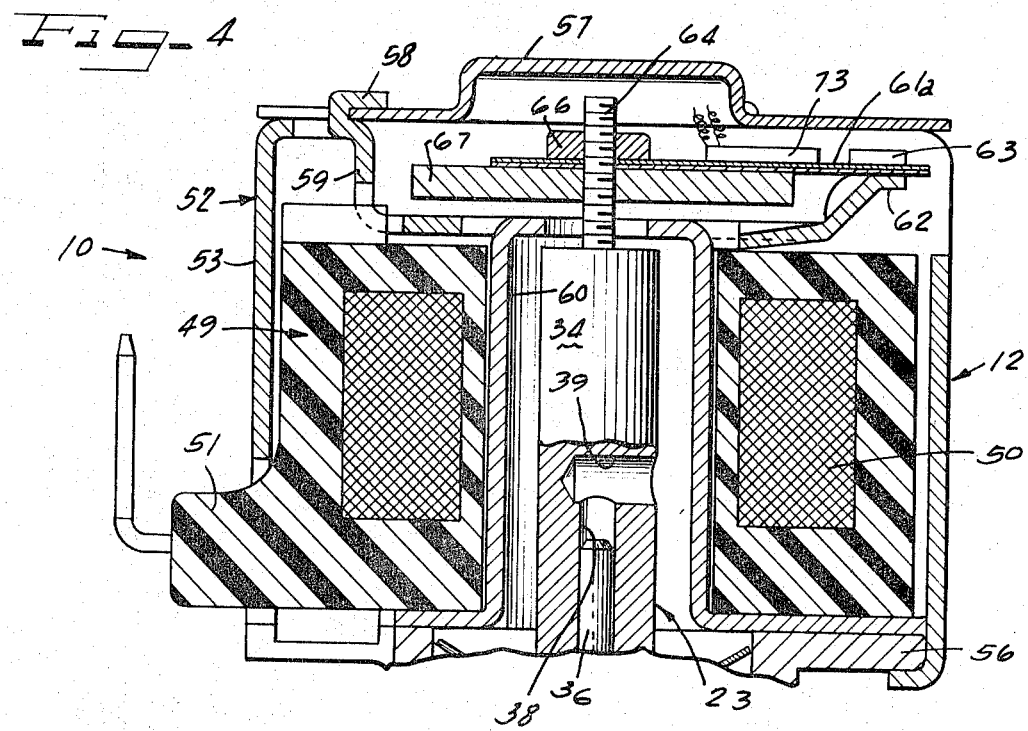
FIG. 4 is a fragmentary vertical sectional view similar to FIG. 1 showing another embodiment of the invention.

An electromechanical transducer constructed in accordance with the principles of the present invention is indicated generally at reference numeral 10 in FIGS. 1–3. The transducer 10 may be more particularly characterized as comprising a vacuum modulator 11 adapted for connection both to a source of vacuum and to a point of use, and a control module 12 for controlling the modulator 11 and the level of vacuum to the point of use.

The vacuum modulator 11 comprises a housing 13 having a vacuum chamber 14 formed therein. A vacuum port 16 and a control port 17 open to the vacuum chamber 14. A pair of hose or the like conduit connectors 18 and 19 extend from the housing 13 and are bored as at 20 and 21 to provide flow passages, the passage 18 communicating with the vacuum port 16 through an interconnecting passageway 22 and passage 19 communicating with the control port 17.

A valve mechanism indicated generally at 23 is provided to regulate the level of vacuum between the vacuum port 16 and the control port 17, and thus the level of vacuum at the point of use. The valve mechanism 23 comprises an elongated operating rod or link 24 mounted on a flexible diaphragm 26 which closes an upper end 27 of the vacuum chamber 14. The diaphragm is secured to the housing 13 by means of a diaphragm lock 28 which forces a bead 29 formed at the periphery of the diaphragm into locking and sealing engagement with a complemental groove 30 formed in the housing 13.

One side 31 of the diaphragm 26 comprises a motive surface subjected to the vacuum condition of the vacuum chamber 14 whereas an opposite side 32 is subjected to atmospheric pressure. Changes in level of the vacuum and vacuum chamber 14 will thus have the effect of moving the link 24 in opposite directions toward and away from a closed or bottom end 33 of the vacuum chamber 14.

A link extension 34 extends upwardly from and in axial alignment with the link 24. The link 24 and the link extension 34 are connected in fixed assembly by a roll pin 36 which is press fit into axially aligned passages 37 and 38. A transverse passageway 39 communicates the upper end of the passageway 38 to atmosphere. A lower end of the passageway 37 comprises a link chamber indicated at 40 which communicates with the passageway 39 through a bore 41 extending longitudinally through the roll pin 36.

In order to control flow to the vacuum port 16 a valve member 42 is disposed for movement into and out of seating engagement with a valve seat 43 formed around the vacuum port 16. Another valve member 44 is situated in the link chamber 40 for movement into and out of seating engagement with a valve seat 46. The link chamber 40 communicates with the vacuum chamber 14 through an axial bore 47 which also receives a valve stem 48 interconnecting the lower and upper valve members 42 and 44 for joint movement.

The control module 12 is characterized as comprising a solenoid assembly 49 mounted above the modulator housing 13 and including a solenoid coil 50 housed within a nylon encapsulator 51.

The assembly 49 is enclosed within a control module housing indicated generally at reference numeral 52 comprising a generally cylindrical sidewall 53 having an inturned flange 54 at the lower end thereof for wrapping underneath a radially extending upper wall 56 of the modulator housing 13. A top cover or cap 57 extends over the top of the cylindrical wall 53 and is locked thereon by a plurality of inturned ears 58 formed on an internal radial rib 59. The rib 59 is connected in fixed assembly to a tubular core piece 60 which extends upwardly through the solenoid encapsulator 51. Thus the cylindrical sidewall 53, the cap 57, the internal rib 59 and the core piece 60 are connected in fixed assembly with each other and with the housing 13 of the vacuum modulator 11.

In order to apply a force to the valve mechanism 23 along the axis thereof a flexible resilient member 61 such as a cantilevered spring is fixedly secured to a flange 62 of the rib 59 by means of a suitable fastener such as a rivet, bolt or the like as indicated at 63. A threaded stud 64 projects upwardly from the link extension 34 and is fixedly secured to the spring 61 by means of a complementarily threaded nut 66. A magnetic sole plate 67 is also threaded onto the stud 64 adjacent the spring 61 in spaced relation to the solenoid assembly 49 and within the lines of flux produced thereby.

Figure 5:
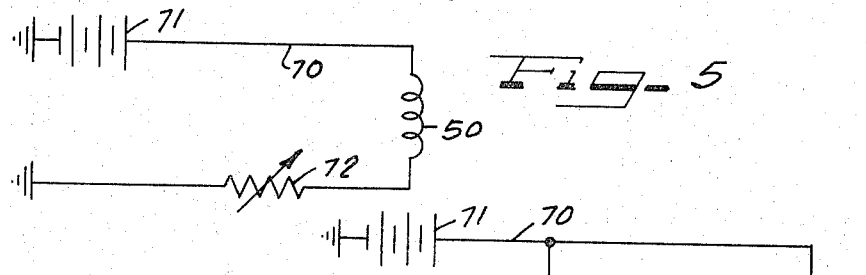
FIG. 5 is a schematic illustrating the electrical circuitry of the present invention.

A pair of electrical connectors 68 and 69 extend from outside the cylindrical wall 53 through the nylon encapsulator 51 into electrical contact with the windings of the solenoid coil 50 for energizing the coil. As shown in the schematic diagram of FIG. 5, the coil 50 may be electrically connected into a circuit 70 having a power source 71 and a variable resistor or rheostat 72 is connected in series with the coil 50 for varying the flow of current therethrough.

The rheostat 72 may be manually operated or may be operated by any suitable device such as a temperature or pressure responsive switch or any other control mechanism.

The spring 61 may be preloaded to maintain a given level of vacuum in the vacuum chamber 14 for a given set of operating conditions. Assume, for example, that the conduit connector 18 is connected to a source of vacuum maintained at 25 inches $H_g$, and assume that the connector 19 communicates the vacuum chamber 14 with a vacuum motor. The spring 61 may be preloaded to maintain, for example, a vacuum level of 20 inches $H_g$, in the vacuum chamber 14 (and thus in the vacuum motor) for a given rate of current flowing through the solenoid coil 50.

Assume that when the conduit connector 18 is connected to the source of 25 inches $H_g$, vacuum the pressure in the vacuum chamber 14 is at atmospheric. Since the pressure on both sides of the diaphragm 26 are the same there are no forces imposed on the valve mechanism 23 by the diaphragm 26 but due to the preloading of the spring 61 in an upward direction, which exceeds the downward force due to the attraction between the sole plate 67 and the solenoid coil 50 at a condition of maximum current through the coil, a cumulative upward force will raise the valve mechanism 23 to lift the valve member 42 off of the valve seat 43 while maintaining the upper valve member 44 in seating engagement with its valve seat 46. The vacuum level will increase (the pressure will decrease) in the vacuum chamber 14 until the downward force imposed on the valve mechanism 23 by the pressure differential across the diaphragm 26 balances the upward force imposed by the spring 61 which, in this example, may occur at a vacuum of 20 inches $H_g$ in the vacuum chamber 14 with maximum current flowing through the solenoid coil 50. The valve mechanism 23 is then urged downwardly until the lower valve member 42 again engages the valve seat 43.

If, while such conditions obtain, the rheostat 42 is adjusted to reduce the flow of current through the coil 50 the downward force imposed on the valve mechanism 23 by the sole plate 67 will be reduced correspondingly. This situation results in a cumulative downward force on the valve mechanism 23.

As the valve mechanism 23 moves downwardly the upper valve member 44 is raised off its respective valve seat 46 to communicate the vacuum chamber 14 with atmosphere through the link chamber 40, the bore 41 of the roll pin 36 and passages 38 and 39. As the vacuum level is reduced (the pressure is increased) in the vacuum chamber 14 the valve mechanism 23 will move slightly upwardly in response to the decreased pressure differential across the diaphragm 26 until the upward and downward forces acting on the valve mechanism 23 are again in balance, whereupon the upper valve member 44 will again be seated on its valve seat 46.

Thus by merely selectively adjusting the rheostat 72 to vary the flow of current through the solenoid coil 50 the level of vacuum in the vacuum chamber 14, at the control port 17 and in the vacuum motor can be varied.

It is noted that for any given preloading of the spring 61, the control of the vacuum level in the vacuum chamber 14 and at the point of use is a function solely of the flow of current through the solenoid coil 50 as regulated by the rheostat 72. Although the rheostat 72 may effectively comprise a plurality of variable resistors or other current-varying devices, only the cumulative effect of all of such devices are imposed on the solenoid coil 50.

In the embodiment shown in FIG. 4, wherein parts similar to those illustrated in FIG. 1 are given like reference characters, the operation of the transducer 10 may be controlled by more than one independently varying condition.

In this embodiment the flexible resilient member 61 comprises a bimetal element 61a rather than a spring. As a consequence, the level of vacuum in the vacuum chamber 14 varies as a function not only of the current flowing through the solenoid coil 50, but also as a function of the temperature ambient the bimetal 61a. In order to provide selectivity to the preloading effect of the bimetal 61a electric heating means such as a resistance heater or the like as indicated at reference numeral 73 may be mounted on or in proximity to the bimetal 61a and, as shown in the schematic drawing of FIG. 6, wired in parallel with the solenoid coil 50 and in series with another variable resistor such as a rheostat indicated at 74.

As a consequence rheostats 72 and 74 may be adjusted in response to independently varying conditions. For example, rheostat 74 may be utilized as a normalizing controller to establish the nonoperating vacuum level in the vacuum chamber 14, and rheostat 72 may be utilized as an operating controller.

Figure 6:
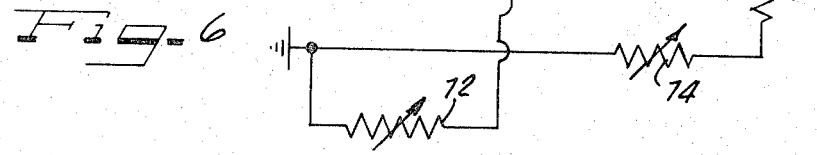
FIGS. 6 and 7 are schematic illustrating other embodiments of the electrical circuit.
Figure 7:
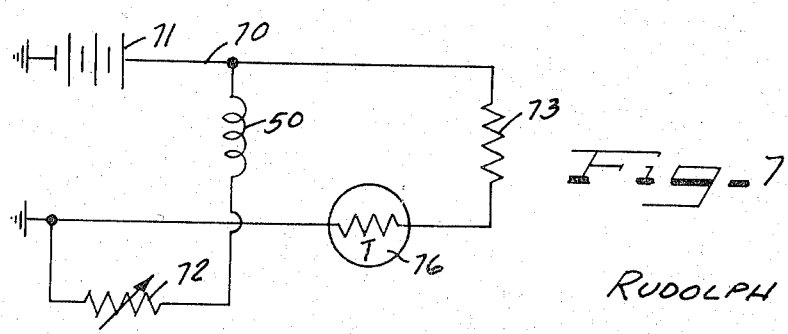

The schematic illustrated in FIG. 7 is similar to the schematic of FIG. 6 except that a thermistor 76 has been substituted for the rheostat 74. In this arrangement the heating effect of the bimetal heater 73 varies as a function of the temperature ambient the thermistor 76. One useful application of this arrangement resides in vacuum motor controlled air conditioning systems, for example, wherein the transducer 10 may be used to control the level of vacuum to the vacuum motor. The rheostat 72 may function as a thermostat for selectively controlling the temperature of the conditioned space and the thermistor 76 may be situated outdoors to vary the normal level of vacuum to the vacuum motor as a function of variations in outdoor temperature.

Although minor modifications might be suggested by those versed in the art, it should be understood that I wish to embody within the scope of the patent warranted hereon all such modifications as reasonably come within the scope of my contribution to the art.

I claim:

1. An electromechanical transducer comprising, a housing having a vacuum port for connection to a source of vacuum, a control port for connection to a point of utilization and a vacuum chamber for communicating said ports with one another, a valve mechanism comprising:

an operating rod movable in opposite directions extending through said housing and into said vacuum chamber and having means forming a passageway therein communicating said vacuum chamber with atmosphere;

a lower valve seat formed around said vacuum port and an upper valve seat formed in said passageway with both valve seats facing in one of said opposite directions;

a valve stem in said vacuum chamber extending into said passageway for reciprocable movement in said opposite directions; and lower and upper valve members formed on said stem for joint movement therewith into and out of seating engagement respectively with said lower and upper valve seats;

pressure differential means connected to said operating rod for movement therewith and having oppositely facing motive surfaces exposed respectively to the vacuum chamber and to atmosphere for imposing a force on said operating rod in one of said opposite directions which varies in accordance with the pressure differential thereacross, means comprising a flexible resilient member fixedly mounted on said housing and rigidly connected to said operating rod, a solenoid mounted on said housing, and a sole plate mounted on said operating rod in spaced relation to said solenoid and attracted thereto with a force which varies in accordance with the current flowing through said solenoid, whereby the combined forces due to said pressure differential means, said solenoid and sole plate and said flexible resilient member acting on said operating rod regulate the movement and positioning of the operating rod and of the valve members and the level of vacuum in said vacuum chamber.

2. The transducer as defined in claim 1 and including circuit means connected to said solenoid and comprising means for varying the current flowing through said solenoid.

3. The transducer as defined in claim 1 wherein said flexible resilient member comprises a bimetal for tending to position said operating rod as a function of temperature ambient the bimetal.

4. The transducer as defined in claim 3 and including circuit means comprising an electric heater situated so as to influence the temperature of said bimetal.

5. The transducer as defined in claim 4 wherein said electric heater is of the variable capacity type and including means in said circuit means for selectively varying the capacity of said heater.

6. The transducer as defined in claim 5 wherein said capacity varying means comprises a manually operated rheostat.

7. The transducer as defined in claim 5 wherein said heater varying means comprises a thermistor.

8. An electromechanical transducer comprising a housing having a vacuum port for connection to a source of vacuum, a control port for connection to a point of use, an air port for connection to the atmosphere, and a vacuum chamber communicating said ports, means comprising a valve mechanism extending into said vacuum chamber and movable in opposite directions for controlling the flow of atmosphere and vacuum through said air and vacuum ports respectively, spring means biasing said valve mechanism in one of said opposite directions, and electric solenoid means comprising a solenoid coil mounted on said housing and a sole plate situated in spaced relation to said coil and operatively connected to said valve mechanism for urging same in said other of said opposite directions against the bias of said spring means with a force which varies as a function of the current flowing through said coil, and said spring means including a bimetal element wherein the biasing force is dependent on the temperature of said element.

9. The transducer as defined in claim 8 and including means biasing said valve member in said other of said opposite directions with a force which varies as a function of the level of vacuum in said vacuum chamber.

10. An electromechanical transducer in accordance with claim 8 wherein said bimetal element is connected to said sole plate for directly modulating said valve mechanism.